United States Patent
Guen

(10) Patent No.: US 10,522,813 B2
(45) Date of Patent: Dec. 31, 2019

(54) SECONDARY BATTERY

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 154 days.

(21) Appl. No.: 15/228,073

(22) Filed: Aug. 4, 2016

(65) Prior Publication Data

US 2017/0162853 A1 Jun. 8, 2017

(30) Foreign Application Priority Data

Dec. 4, 2015 (KR) .................. 10-2015-0172228

(51) Int. Cl.
| | | |
|---|---|---|
| *H01M 2/34* | (2006.01) | |
| *H01M 2/04* | (2006.01) | |
| *H01M 2/20* | (2006.01) | |
| *H01M 2/26* | (2006.01) | |
| *H01M 2/30* | (2006.01) | |
| *H01M 10/0525* | (2010.01) | |
| *H01M 2/06* | (2006.01) | |

(52) U.S. Cl.
CPC ............. *H01M 2/345* (2013.01); *H01M 2/04* (2013.01); *H01M 2/06* (2013.01); *H01M 2/202* (2013.01); *H01M 2/26* (2013.01); *H01M 2/30* (2013.01); *H01M 2/34* (2013.01); *H01M 10/0525* (2013.01); *H01M 2200/103* (2013.01); *H01M 2200/20* (2013.01); *H01M 2220/20* (2013.01); *H01M 2220/30* (2013.01)

(58) Field of Classification Search
CPC ....... H01M 10/0525; H01M 2200/103; H01M 2200/20; H01M 2220/20; H01M 2220/30; H01M 2/04; H01M 2/06; H01M 2/202; H01M 2/26; H01M 2/30; H01M 2/34; H01M 2/345

See application file for complete search history.

(56) References Cited

U.S. PATENT DOCUMENTS

| | | | | |
|---|---|---|---|---|
| 2006/0024573 A1* | 2/2006 | Yim | ................... | H01M 2/08 429/174 |
| 2010/0291421 A1* | 11/2010 | Byun | ................... | H01M 2/043 429/61 |
| 2011/0159353 A1* | 6/2011 | Byun | ................... | H01M 2/206 429/160 |
| 2012/0058389 A1* | 3/2012 | Guen | ................... | H01M 2/0237 429/179 |

(Continued)

FOREIGN PATENT DOCUMENTS

| | | |
|---|---|---|
| JP | 10-284037 A | 10/1998 |
| KR | 10-2014-0020481 A | 2/2014 |
| KR | 10-2015-0053597 A | 5/2015 |

*Primary Examiner* — Adam A Arciero
(74) *Attorney, Agent, or Firm* — Lee & Morse, P.C.

(57) ABSTRACT

A secondary battery includes an electrode assembly including a first electrode plate, a second electrode plate and a separator, a case accommodating the electrode assembly, a cap plate sealing the case and including a first terminal hole, and a first terminal coupled to the first terminal hole. The first terminal includes at least two groove portions having a predetermined depth from a top surface of the first terminal, the at least two groove portions being spaced apart from each other.

6 Claims, 4 Drawing Sheets

(56) References Cited

U.S. PATENT DOCUMENTS

| | | | | |
|---|---|---|---|---|
| 2012/0288744 | A1* | 11/2012 | Guen | H01M 2/206 |
| | | | | 429/158 |
| 2013/0260611 | A1* | 10/2013 | Ahn | H01M 2/1077 |
| | | | | 439/627 |
| 2014/0045009 | A1 | 2/2014 | Kim | |
| 2014/0377600 | A1* | 12/2014 | Guen | H01M 2/0456 |
| | | | | 429/61 |
| 2015/0132618 | A1 | 5/2015 | Han | |

\* cited by examiner

SECONDARY BATTERY

CROSS-REFERENCE TO RELATED APPLICATION

Korean Patent Application No. 10-2015-0172228, filed on Dec. 4, 2015, in the Korean Intellectual Property Office, and entitled: "Secondary Battery," is incorporated by reference herein in its entirety.

BACKGROUND

1. Field

Embodiments relate to a secondary battery.

2. Description of the Related Art

In general, unlike primary batteries which cannot be recharged, secondary batteries can be repeatedly charged and discharged. Low capacity batteries that use single battery cells packaged in packs may be used as power sources for various small portable electronic devices such as cellular phones, and camcorders. High capacity batteries that use tens of battery cells connected to each other in a battery pack may be used as power sources for driving motors of hybrid vehicles, and the like. Secondary batteries may be manufactured in various shapes, including a prismatic shape, a cylinder shape, and a pouch shape.

SUMMARY

Embodiments are directed to a secondary battery including an electrode assembly including a first electrode plate, a second electrode plate and a separator, a case accommodating the electrode assembly, a cap plate sealing the case and including a first terminal hole, and a first terminal coupled to the first terminal hole. The first terminal includes at least two groove portions having a predetermined depth from a top surface of the first terminal, the at least two groove portions being spaced apart from each other.

The electrode assembly may further include a first electrode collector tab electrically connected to and extending from the first electrode plate and a second electrode collector tab electrically connected to and extending from the second electrode plate. The first electrode collector tab may be connected to a region of the cap plate adjacent to the first terminal hole.

The first terminal may further include an hollow part having an interior portion opened toward the electrode assembly and connected to the first terminal hole.

The first terminal may include a first region positioned in the cap plate, a second region that protrudes relative to first region, and a third region connecting the first region and the second region.

The groove portions may be located in the second region of the first terminal.

A fail-safe region may be located in each of the groove portions. The fail-safe region may have a smaller sectional area than exterior regions of the groove portions in the second region.

The fail-safe region may be cuttable by fusing when an over-current flows in the first terminal.

The fail-safe region may be rupturable when the internal pressure of the secondary battery exceeds a reference pressure.

A bus bar may be coupled between groove portions of the first terminal.

A width of the bus bar may be less than a distance between the groove portions.

The bus bar may be connected to another secondary battery adjacent to the secondary battery to electrically connect the secondary battery and the adjacent secondary battery to each other.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
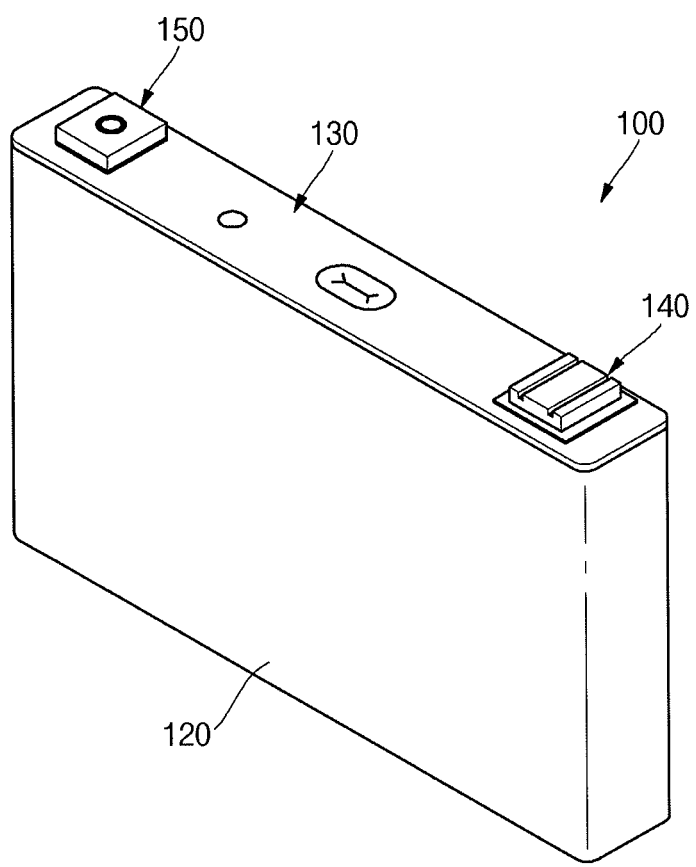
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
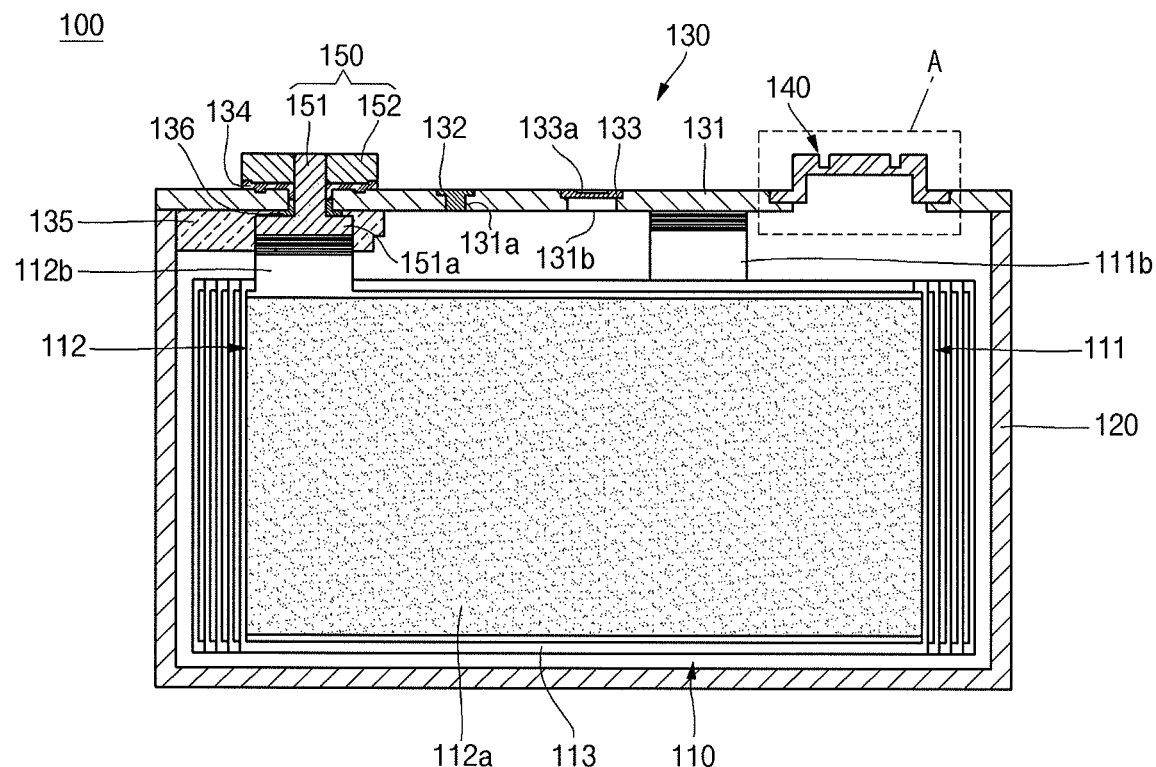
FIG. 2 illustrates a cross-sectional view of the secondary battery illustrated in FIG. 1.
Figure 3:
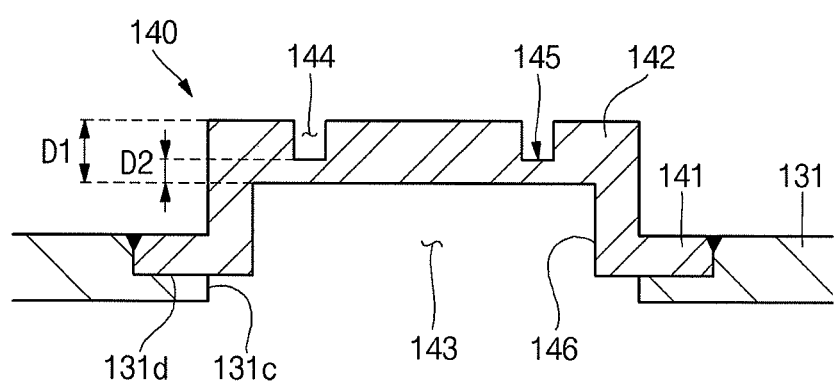
FIG. 3 illustrates an enlarged cross-sectional view depicting a portion 'A' of FIG. 2.

FIG. 1 illustrates a perspective view of a secondary battery according to an embodiment, FIG. 2 illustrates a cross-sectional view of the secondary battery depicted in FIG. 1, and FIG. 3 illustrates an enlarged cross-sectional view illustrating a portion 'A' of FIG. 2.

Referring to FIGS. 1 to 3, the secondary battery 100 according to an embodiment may include an electrode assembly 110, a case 120, a cap assembly 130, a first terminal 140, and a second terminal 150.

The electrode assembly 110 may be formed by winding or laminating a stack including a first electrode plate 111, a separator 113 and a second electrode plate 112, which are in a form of thin plates or layers. The first electrode plate 111 may serve as a positive electrode and the second electrode plate 112 may serve as a negative electrode, or vice versa.

The first electrode plate 111 may be formed, for example, by coating a first electrode active material, such as a transition metal oxide, onto a first electrode current collector plate formed of a metal foil or mesh, such as an aluminum or aluminum alloy foil or mesh. The first electrode plate 111 may include a first electrode active material layer corresponding to a region onto which the first electrode active material is applied and a first electrode uncoated portion corresponding to a region to which the first electrode active material is not applied. In addition, the first electrode plate 111 may include a first electrode collector tab 111b that extends outwardly (upwardly) from the first electrode uncoated portion and is electrically connected to a bottom surface of a cap plate 131 adjacent to the first terminal 140.

The first electrode collector tab 111b may provide a path for current to flow between the first electrode plate 111 and the first terminal 140.

The second electrode plate 112 may be formed, for example, by coating a first electrode active material, such as graphite or carbon, onto a second electrode current collector plate formed of a metal foil or mesh, such as a copper, copper alloy, nickel or nickel alloy foil or mesh. The second electrode plate 112 may include a second electrode active material layer 112a corresponding to a region onto which the second electrode active material is applied and a second electrode uncoated portion corresponding to a region to which the second electrode active material is not applied. The second electrode plate 112 may include a second electrode collector tab 112b that extends outwardly (upwardly) from the second electrode uncoated portion and is electrically connected to the second terminal 150. The second electrode collector tab 112b may provide a path for current to flow between the second electrode plate 112 and the second terminal 150.

In some implementations, polarities of the first electrode plate 111 and the second electrode plate 112 may be reversed.

The separator 113 may be disposed between the first electrode plate 111 and the second electrode plate 112 to prevent a short circuit and to allow the movement of lithium ions. The separator 113 may be formed of a polyethylene film, a polypropylene film, or a composite film including polyethylene and polypropylene, as examples.

A winding axis of the electrode assembly 110 may be formed to be substantially parallel or horizontal with terminal axes of the first and second terminals 140 and 150. Here, the terms "winding axis" and "terminal axes" may refer to axes formed in an up-and-down direction in FIG. 2. Here, when the winding axis and the terminal axes are referred to as being substantially parallel or horizontal with each other, it is meant that the winding axis and the terminal axes may not meet each other even if they are elongated or may meet each other if they are exceedingly elongated.

In addition, as described above, the first electrode collector tab 111b may be interposed between the electrode assembly 110 and a bottom surface of the cap plate 131 adjacent to the first terminal 140. The second electrode collector tab 112b may be interposed between the electrode assembly 110 and the second terminal 150. The first electrode collector tab 111b may extend from a top end of the electrode assembly 110 to the bottom surface of the cap plate 131 adjacent to the first terminal 140 to then be connected or welded. The second electrode collector tab 112b may extend from the top end of the electrode assembly 110 to the second terminal 150 to then be connected or welded.

The first electrode collector tab 111b may be the first electrode uncoated portion itself, which is a portion of the first electrode plate 111 on which the first electrode active material is not coated, as described above, or may be a separate member connected to the first electrode uncoated portion. When the first electrode collector tab 111b is a separate member, the separate member may be made of one selected from aluminum, an aluminum alloy, nickel, a nickel alloy, copper, a copper alloy and equivalents thereof.

The second electrode collector tab 112b may be the second electrode uncoated portion itself, which is a portion of the second electrode plate 112 on which the second electrode active material is not coated, as described above, or may be a separate member connected to the second electrode uncoated portion. When the second electrode collector tab 112b is a separate member, the separate member may be made of one selected nickel, a nickel alloy, copper, a copper alloy, aluminum, an aluminum alloy and equivalents thereof.

As described above, the winding axis of the electrode assembly 110 and the terminal axes of the first and second terminals 140 and 150 may be substantially parallel or horizontal with each other. Accordingly, an electrolyte injecting direction and the winding axis may also be parallel or horizontal with each other, thereby providing an excellent impregnating efficiency of the electrode assembly 110 when an electrolyte is injected and allowing the safety vent 133 to quickly operate by allowing internal gases to rapidly move to the safety vent 133.

The first and second electrode collector tabs 111b and 112b (the electrode uncoated portions or separate members) of the electrode assembly 110 are directly electrically connected to the first and second terminals 140 and 150, respectively. Accordingly, electrical paths between the first and second electrode collector tabs 111b and 112b and the first and second terminals 140 and 150 may be shortened, thereby lowering internal resistance of the secondary battery 100 and reducing the number of components.

The electrode assembly 110 may be substantially accommodated in the case 120 together with the electrolyte. The electrolyte may include a mixture having a lithium salt, such as $LiPF_6$ or $LiBF_4$, dissolved in an organic solvent, such as EC, PC, DEC, EMC or DMC. The electrolyte may exist in a liquid, solid or gel phase.

The case 120 may be made of a conductive metal, such as aluminum, an aluminum alloy or nickel plated steel. The case 120 may be shaped roughly as a hexahedron having an hollow opening in which the electrode assembly 110 is inserted and placed. The case 120 may have two pairs of side surfaces spaced a predetermined distance apart from each other and facing each other and a bottom surface formed at bottom portions of the two pairs of side surfaces to be perpendicular to the two pairs of side surfaces. The interior surface of the case 120 may be subjected to an insulation treatment to be insulated from the electrode assembly 110. The case 120 may also be referred to as a can.

The cap assembly 130 may be coupled to the case 120. The cap assembly 130 may seal the opening of the case 120. In the illustrated embodiment, the case 120 and the cap plate 131 are coupled to each other, and the opening of the case 120 is not shown. The opening of the case 120 corresponds to a substantially opened portion of a top portion of the case 120. The cap assembly 130 may include the cap plate 131, a plug 132, a safety vent 133, an upper insulation member 134, a lower insulation member 135 and a seal gasket 136.

The cap plate 131 may be made of the same material as the case 120. The cap plate 131 may seal the opening of the case 120. The cap plate 131 may be coupled to the case 120 by, for example, laser welding and/or ultrasonic welding. The cap plate 131 may include an electrolyte injection hole 131a through which an electrolyte is injected, a vent hole 131b having a safety vent 133 formed therein, a first terminal hole 131c having a first terminal 140 formed therein, and a second terminal hole through which the second terminal 150 passes. A stepped part 131d may be formed in a region adjacent to the first terminal hole 131c of the cap plate 131 to allow the first terminal 140 to be placed therein.

As described above, the first electrode collector tab 111b may be attached to the bottom surface of the cap plate 131 adjacent to the first terminal hole 131c. The cap plate 131 and the first electrode collector tab 111b have the same polarity, and accordingly, the case 120 and the first electrode collector tab 111b may also have the same polarity.

The plug 132 may seal the electrolyte injection hole 131a of the cap plate 131. The safety vent 133 may be installed in the vent hole 131b of the cap plate 131 and a notch 133a may be formed therein to be easily openable at a predetermined pressure.

The upper insulation member 134, the lower insulation member 135 and the seal gasket 136 may be interposed between the second terminal 150 and the cap plate 131. For example, the upper insulation member 134 may be interposed between a top portion of the cap plate 131 and the second terminal 150, and the lower insulation member 135 may be interposed between a bottom portion of the second terminal 150 of the cap plate 131 and the second electrode collector tab 112b. The seal gasket 136 may be formed between the cap plate 131 and the second terminal 150 in a state in which the seal gasket 136 is brought into close contact with the upper insulation member 134 and the lower insulation member 135. The upper insulation member 134, the lower insulation member 135 and the seal gasket 136 may seal the second terminal hole through the second terminal 150 passes, thereby electrically insulating the cap plate 131 and the second terminal 150 from each other.

The first terminal 140 may be made of the same material as the cap plate 131. The first terminal may be formed to cover the first terminal hole 131c of the cap plate 131. The first terminal 140 may be electrically connected to the first electrode plate 111. The first electrode collector tab 111b may extend from the first electrode plate 111 and may be connected to the bottom surface of the cap plate 131 such that the first electrode collector tab 111b and the cap plate 131 may have the same polarity. Accordingly, the first terminal 140 formed in the cap plate 131 may also have the same polarity as the first electrode plate 111. A bus bar may be to be placed on the first terminal 140 to electrically connect a plurality of secondary batteries 100 to one another, as described below.

Referring to FIG. 3, the first terminal 140 may include a first region 141 placed in the stepped part 131d of the cap plate 131, a second region 142 that protrudes upwardly relative to the first region 141, and a third region 146 connecting the first and second regions 141 and 142 to each other. The first terminal 140 may further include a hollow part 143 having an interior side that is open toward the electrode assembly 110.

The first region 141 may be placed in the stepped part 131d of the cap plate 131. Boundary regions of the first region 141 and the stepped part 131d may be welded to each other. The boundary regions of the upwardly exposed first region 141 and the cap plate 131 may be welded to each other. For example, laser beams may be applied to the boundary regions of the upwardly exposed first region 141 and the cap plate 131, thereby fusing the boundary regions to each other, to then be cooled and welded to each other.

The second region 142 may protrude relative to the top surface of the cap plate 131. The second region 142 may be located higher than the first region 141 relative to the cap plate 131. The second region 142 may be a region to which the bus bar is to be coupled later. The second region 142 may include at least two groove portions 144 inwardly recessed from the top surface of the second region 142 by a predetermined thickness. The respective groove portions 144 may be spaced a predetermined distance apart from each other. The hollow part 143 of the first terminal 140 may be located under the groove portions 144.

A fail-safe region 145 is formed in a region of the second region 142 corresponding to each of the groove portions 144. For example, the fail-safe region 145 may be at the bottom of each of the groove portions 144. The fail-safe region 145 may be formed to have a smaller sectional area than a region of the second region 142 where the groove portions 144 are not formed. A thickness D1 ranging from the top surface of the second region 142 to the hollow part 143 may be larger than a thickness D2 of the fail-safe region 145. When over-current flows in the secondary battery 100, the fail-safe region 145 may function as a fuse. In addition, when the internal pressure of the secondary battery 100 rises, the safe region 145 may be ruptured to serve as an additional safety vent, as will be described in detail below.

The hollow part 143 may be formed to be opened to a predetermined depth from the bottom surface of the first region 141. Due to the hollow part 143, the first terminal 140 may be configured to have a hollow interior side. The hollow part 143 may be formed to be connected to the first terminal hole 131c of the cap plate 131. When the fail-safe region 145 serves as a fuse, the sectional area of the fail-safe region 145 may be reduced due to the hollow part 143, thereby facilitating fusing of the fail-safe region 145. In addition, when the fail-safe region 145 serves as a safety vent, the internal pressure of the secondary battery 100 may be transferred to the fail-safe region 145 through the hollow part 143, thereby facilitating rupturing of the fail-safe region 145.

The third region 146 may connect the first region 141 and the second region 142 to each other. The third region 146 may extend from the first region 141 to protrude upwardly from the cap plate 131. Accordingly, the second region 142 may be in a protruded position relative to the cap plate 131.

The second terminal 150 may be electrically connected to the second electrode plate 112. The second terminal 150 may include a terminal pillar 151 and a terminal plate 152.

The terminal pillar 151 may pass through the second terminal hole of the cap plate 131 to then upwardly protrude and extend a predetermined length. The terminal pillar 151 may be electrically connected to the second electrode collector tab 112b under the cap plate 131. The terminal pillar 151 may include a flange 151a formed under the cap plate 131 to prevent the terminal pillar 151 from being dislodged from the cap plate 131. The second electrode collector tab 112b may be electrically connected or welded to the flange 151a. The terminal pillar 151 may be electrically insulated from the cap plate 131.

The terminal plate 152 may include a centrally formed hole. The terminal pillar 151 may be coupled and welded to the hole. Boundary regions of the upwardly exposed terminal pillar 151 and the terminal plate 152 may be welded to each other. For example, laser beams may be applied to the boundary regions of the upwardly exposed terminal pillar 151 and the terminal plate 152, thereby fusing the boundary regions to each other to then be cooled and welded to each other.

Figure 4:
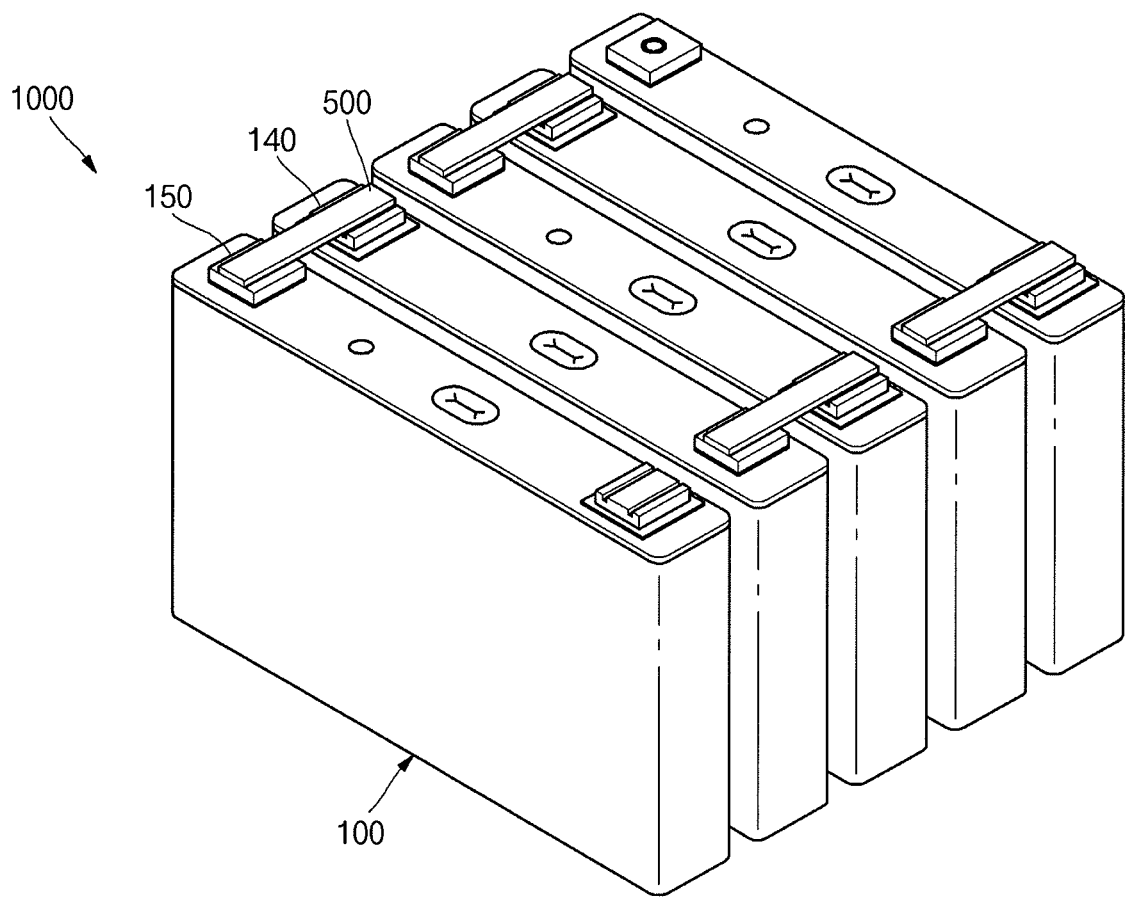
FIG. 4 illustrates a perspective view of a battery module using a secondary battery according to an embodiment.
Figure 5:
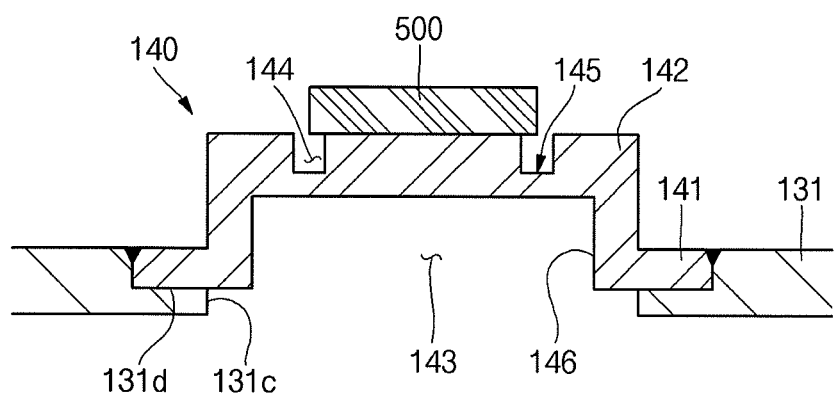
FIGS. 5 and 6 illustrate cross-sectional views for explaining the operation of a fail-safe region of a first terminal in the battery module illustrated in FIG. 4.
Figure 6:
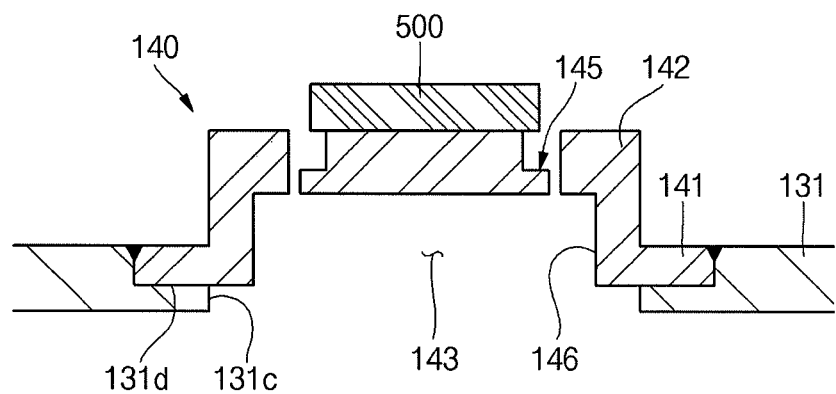

FIG. 4 illustrates a perspective view of a battery module using a secondary battery according to another embodiment, FIGS. 5 and 6 are cross-sectional views for explaining the operation of a fail-safe region of a first terminal in the battery module illustrated in FIG. 4.

As illustrated in FIG. 4, the plurality of secondary batteries 100 may be arranged in a row and a plurality of bus bars 500 may be coupled to the arranged secondary batteries 100, thereby completing a single battery module 1000. For example, the first terminal 140 of one secondary battery 100 and the second terminal 150 of another secondary battery 100 adjacent to the one secondary battery 100 may be welded by the bus bar 500, thereby providing the battery module 1000 including the plurality of secondary batteries 100 connected in series to one another. The bus bar 500 may be made of aluminum or an aluminum alloy. The first terminal 140 and the terminal plate 152 of the second terminal 150 may also be made of aluminum or an aluminum alloy, such that the bus bar 500 may be easily welded to the first terminal 140 and the second terminal 150.

In an event of abnormal charging or discharging (external short circuit) operation, the fail-safe region 145 may be operated to cut off the current flowing in the battery module 1000, thereby securing the safety of the battery module 1000.

As illustrated in FIG. 5, the bus bar 500 may be coupled to the first terminal 140 of each of the secondary batteries 100 of the battery module 1000. The bus bar 500 may be positioned between the two groove portions 144 spaced apart from each other in the second region 142. For example, the bus bar 500 may have a smaller width than a maximum distance between the two groove portions 144. During normal charging and discharging operation of the battery module 1000, current may flow between the bus bar 500 and the first and second terminals 140 and 150 connected to the bus bar 500. The bus bar 500 may be connected to a second terminal of another secondary battery 100 adjacent to the secondary battery 100 such that different secondary batteries are connected to each other.

As illustrated in FIG. 6, when the battery module 1000 is abnormally charged or discharged (causing an external short circuit), the fail-safe region 145 may be cut, thereby cutting off the flow of current between adjacent secondary batteries. The bus bar 500 may be located between the groove portions 144 such that when the fail-safe region 145 is cut, a connection between the bus bar 500 and the cap plate 131 is interrupted. When the connection between the bus bar 500 and the cap plate 131 is interrupted, the flow of current between adjacent secondary batteries may be cut off.

The fail-safe region 145 may be fused by heat generated by an electrical short circuit to then be cut. For example, when an over-current flows to the second region 142 due to the electrical short circuit occurring in the secondary battery 100 or the battery module 1000, the fail-safe region 145 having the smallest sectional area may be cut by fusing, thereby cutting off the flow of current between the bus bar 500 and the cap plate 131 or between the bus bar 500 and the first electrode plate (111*b* of FIG. 2). When the fail-safe region 145 functions as a fuse, it may be possible to provide safety against the abnormal operation of the battery module 1000.

When the internal pressure of the secondary battery 100 increases above a predetermined amount, the fail-safe region 145 may be ruptured. For example, when the internal pressure of the secondary battery 100 or the battery module 1000 exceeds a reference pressure due to over-charge, the fail-safe region 145 having the smallest sectional area may be easily ruptured, and the current flowing between the bus bar 500 and the cap plate 131 or between the bus bar and the first electrode plate (111*b* of FIG. 2) may be cut off. When the fail-safe region 145 functions as a safety vent, the safety against an abnormal operation of the battery module 1000 may be improved.

As described above, according to an embodiment, during abnormal charging and discharging operations of the battery module 1000, the fail-safe region 145 may function as a fuse or a safety vent, thereby cutting off the flow of current. A charging or discharging operation of the secondary battery 100 or the battery module 1000 may be interrupted before a dangerous situation, such as ignition or explosion, occurs.

Figure 7:
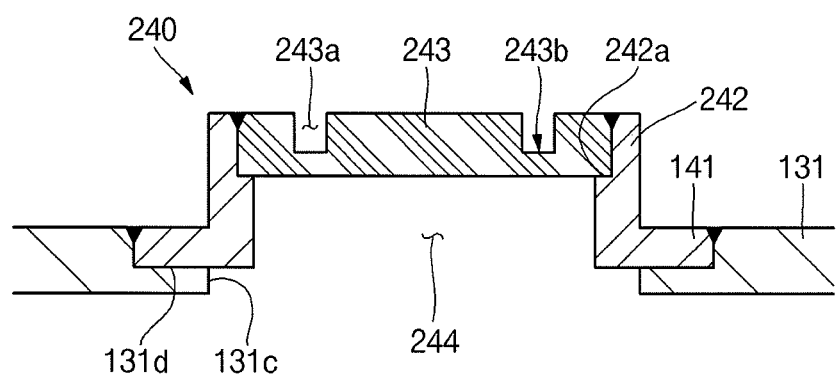
FIG. 7 illustrates an enlarged cross-sectional view depicting a portion 'A' of FIG. 2 in a secondary battery according to still an embodiment.

FIG. 7 illustrates an enlarged cross-sectional view depicting a portion 'A' of FIG. 2 in a secondary battery according to an embodiment.

Referring to FIG. 7, in the secondary battery according to this embodiment, the first terminal 240 includes a first region 141, a second region 242 and a third region 243. The secondary battery according to this embodiment is substantially the same as the secondary battery according to the previous embodiment, except for a configuration of the first terminal 240. Accordingly, descriptions of substantially identical features will not be repeated.

The first terminal 240 may include the first region 141 placed in a stepped part 131*d*, the second region 242 extending from the first region 141 and upwardly protruding from the cap plate 131, and the third region 243 connected to the second region 142. The first terminal 240 may further include a hollow part 244 having an interior side that is open toward the electrode assembly 110.

The first region 141 may be placed in the stepped part 131*d* of the cap plate 131. Boundary regions of the first region 141 and the stepped part 131*d* may be welded to each other. The boundary regions of the upwardly exposed first region 141 and the cap plate 131 may be welded to each other.

The second region 242 may be vertically bent from the first region 141 to then protrude upwardly from the cap plate 131. The second region 242 may further include a stepped part 242*a* in which the third region 243 is placed.

The third region 243 may be placed in the stepped part 242*a* to then cover the first terminal hole 131*c* of the cap plate 131. Boundary regions of the third region 243 and the second region 242 may be welded and coupled to each other. The third region 243 may be a region that is substantially coupled to a bus bar. The third region 243 may include at least two groove portions 243*a* inwardly recessed from the top surface of the third region 243 by a predetermined thickness. The respective groove portions 243*a* may be spaced a predetermined distance apart from each other. The hollow part 244 may be located under the groove portions 243*a*.

A fail-safe region 243*b* may be formed in a region of the third region 243 corresponding to each of the groove portions 243*a*. The fail-safe region 243*b* may be formed to have a smaller sectional area than a region of the third region 243 where the groove portions 243*a* are not formed. The fail-safe region 243*b* may have a smaller thickness than a region of the third region 243, where the fail-safe region 243*b* is not formed. When an electrical short circuit occurs to the secondary battery, the fail-safe region 243*b* may function as a fuse. When the internal pressure of the secondary battery rises abnormally, the fail-safe region 243*b* may be ruptured to serve as a safety vent.

The hollow part 244 may be formed to be opened to a predetermined depth from the bottom surface of the first region 141. The hollow part 244 may be formed to be connected to the first terminal hole 131*c* of the cap plate 131. When the fail-safe region 243*b* serves as a fuse, the sectional area of the fail-safe region 243*b* may be reduced by the hollow part 244, thereby facilitating fusing of the fail-safe region 243*b*. In addition, when the fail-safe region 243*b* serves as a safety vent, the internal pressure of the secondary battery may be transferred to the fail-safe region 243*b* through the hollow part 244, thereby facilitating rupturing of the fail-safe region 243*b*.

By way of summation and review, a secondary battery may be fabricated by forming an electrode assembly having a separator as an insulator disposed between a positive electrode plate and a negative electrode plate, accommodating the fabricated electrode assembly and an electrolyte in a case, and installing a cap assembly in the case. In addition, positive and negative electrode terminals are connected to the electrode assembly and are exposed or protruded to the outside through the cap plate.

Embodiments provide a secondary battery, in which the safety of the secondary battery may be improved by providing a fail-safe region at a first terminal to cut off the flow of current during abnormal charging and discharging operations of the secondary battery or a battery module Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
an electrode assembly including a first electrode plate, a second electrode plate and a separator;
a case accommodating the electrode assembly;
a cap plate sealing the case and including a first terminal hole; and
a first terminal directly coupled to the first terminal hole of the cap plate, the first terminal including a first region positioned in the cap plate, a second region that protrudes relative to first region, and a third region connecting the first region and the second region, the first region, the second region, and the third region defining a hollow part having an interior portion that is open towards the electrode assembly and connected to the first terminal hole, wherein:
the first terminal includes at least two groove portions having a predetermined depth from a top surface of the second region of the first terminal, the at least two groove portions being spaced apart from each other and extending across an entire width of the top surface of the second region in a direction perpendicular to an extending direction of the cap plate, and the electrode assembly further includes a first electrode collector tab electrically connected to and extending from the first electrode plate, the first electrode tab being directly connected to a region of the cap plate adjacent to the first terminal hole.

2. The secondary battery as claimed in claim 1, wherein:
the electrode assembly further includes a second electrode collector tab electrically connected to and extending from the second electrode plate.

3. The secondary battery as claimed in claim 1, wherein:
a fail-safe region is located in each of the groove portions, and the fail-safe region has a smaller sectional area than portions of the second region of the first terminal where the groove portions are not located, wherein the sectional area of the fail-safe region is such that the fail-safe region is cuttable by fusing when an overcurrent flows in the first terminal and is rupturable when an internal pressure of the secondary battery exceeds a reference pressure.

4. The secondary battery as claimed in claim 1, wherein a bus bar is coupled between the groove portions of the first terminal.

5. The secondary battery as claimed in claim 4, wherein a width of the bus bar is less than a distance between the groove portions.

6. The secondary battery as claimed in claim 4, wherein the bus bar is connected to another secondary battery adjacent to the secondary battery to electrically connect the secondary battery and the adjacent secondary battery to each other.

* * * * *